(12) United States Patent
Fang et al.

(10) Patent No.: US 12,529,120 B2
(45) Date of Patent: Jan. 20, 2026

(54) THERMAL PROCESSING METHOD FOR NIOBIUM-CONTAINING HIGH-ALLOY AUSTENITIC HEAT-RESISTANT STAINLESS STEEL BAR

(71) Applicant: Shanxi Taigang Stainless Steel Co., Ltd., Taiyuan (CN)

(72) Inventors: Xudong Fang, Taiyuan (CN); Yang Li, Taiyuan (CN); Fanghong Xu, Taiyuan (CN); Yan Xia, Taiyuan (CN); Wei Zhang, Taiyuan (CN); Jianwei Zhao, Taiyuan (CN)

(73) Assignee: Shanxi Taigang Stainless Steel Co., Ltd., Taiyuan (CN)

( * ) Notice: Subject to any disclaimer, the term of this patent is extended or adjusted under 35 U.S.C. 154(b) by 369 days.

(21) Appl. No.: 18/251,842

(22) PCT Filed: May 11, 2022

(86) PCT No.: PCT/CN2022/092122
§ 371 (c)(1),
(2) Date: May 4, 2023

(87) PCT Pub. No.: WO2023/284391
PCT Pub. Date: Jan. 19, 2023

(65) Prior Publication Data
US 2024/0002967 A1    Jan. 4, 2024

(30) Foreign Application Priority Data

Jul. 14, 2021    (CN) .......................... 202110795237.3

(51) Int. Cl.
*C21D 9/08*    (2006.01)
*B21B 3/02*    (2006.01)
(Continued)

(52) U.S. Cl.
CPC .................. *C21D 9/08* (2013.01); *B21B 3/02* (2013.01); *C21D 8/105* (2013.01); *C22C 38/001* (2013.01);
(Continued)

(58) Field of Classification Search
CPC ..... B21B 3/02; C21D 2211/001; C21D 6/004; C21D 7/13; C21D 8/065; C21D 8/105;
(Continued)

(56) References Cited

FOREIGN PATENT DOCUMENTS

| CN | 1519388 A | 8/2004 |
|---|---|---|
| CN | 102994905 A | 3/2013 |

(Continued)

OTHER PUBLICATIONS

NPL: on-line translation of CN 102994905 B Mar. 2013 (Year: 2013).*

(Continued)

*Primary Examiner* — Jie Yang
(74) *Attorney, Agent, or Firm* — James E. Walton

(57) ABSTRACT

The present disclosure relates to a hot working method for stainless steel bars, comprising: step (1) heating a steel ingot at a heating temperature in a range from 1200° C. to 1270° C.; step (2) subjecting the heated steel ingot to radial forging and cogging down according to a total compression ratio greater than 3 to obtain a square billet; step (3) heating the square billet at a heating temperature in a range from 1200° C. to 1270° C.; and step (4) subjecting the heated square billet to hot rolling to obtain a bar. The processing method of the present disclosure can avoid the quality defect of surface crack while ensuring production efficiency by optimizing the process flow and controlling key process parameters, so that niobium-containing high-alloy austenitic heat-resistant stainless steel bars with good surface quality and structure can be prepared.

6 Claims, 1 Drawing Sheet

(51) Int. Cl.
*C21D 8/10* (2006.01)
*C22C 38/00* (2006.01)
*C22C 38/02* (2006.01)
*C22C 38/04* (2006.01)
*C22C 38/48* (2006.01)

(52) U.S. Cl.
CPC ............ *C22C 38/002* (2013.01); *C22C 38/02* (2013.01); *C22C 38/04* (2013.01); *C22C 38/48* (2013.01)

(58) Field of Classification Search
CPC ........... C21D 9/08; C22C 38/12; C22C 38/04; C22C 38/02; C22C 38/001
See application file for complete search history.

(56) References Cited

FOREIGN PATENT DOCUMENTS

| | | |
|---|---|---|
| CN | 103741065 A | 4/2014 |
| CN | 105648360 A | 6/2016 |
| CN | 106623711 A | 5/2017 |
| CN | 108220783 A | 6/2018 |
| CN | 113523012 A | 10/2021 |
| JP | 2003183782 A | 7/2003 |

OTHER PUBLICATIONS

NPL: on-line translation of CN 106623711 A, May 2017 (Year: 2017).*
Written Opinion of the International Searching Authority dated Aug. 1, 2020 for Parent PCT Appl. No. PCT/CN2022/092122.
International Search Report dated Aug. 4, 2022 for Parent PCT Appl. No. PCT/CN2022/092122.
Written Opinion of the International Searching Authority for Parent PCT Appl. No. PCT/CN2022/092122.
First Search Report from Chinese Appl. No. 2021107952373.
Supplemental Search Report from Chinese Appl. No. 2021107952373.
First Office Action from Chinese Appl. No. 2021107952373.

* cited by examiner

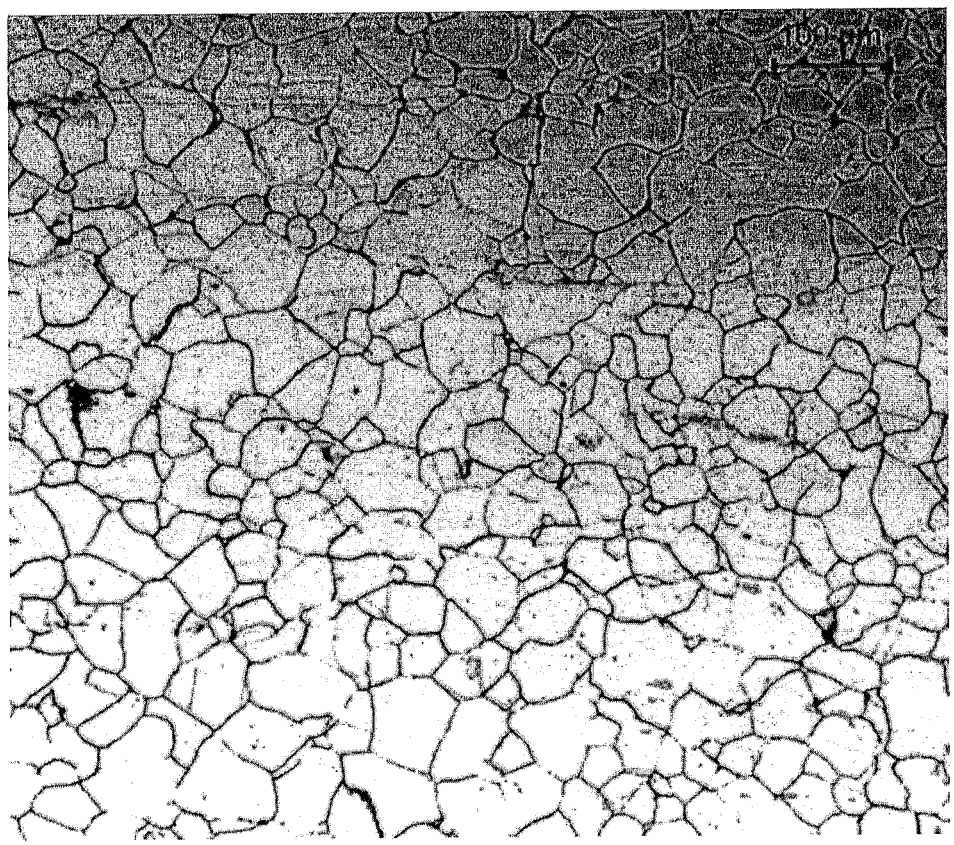

THERMAL PROCESSING METHOD FOR NIOBIUM-CONTAINING HIGH-ALLOY AUSTENITIC HEAT-RESISTANT STAINLESS STEEL BAR

CROSS-REFERENCE TO RELATED APPLICATIONS

The present disclosure claims the priority of Chinese Patent Application No. 202110795237.3, filed with the China National Intellectual Property Administration on Jul. 14, 2021, and entitled "HOT WORKING METHOD FOR NIOBIUM-CONTAINING HIGH-ALLOY AUSTENITIC HEAT-RESISTANT STAINLESS STEEL BAR", the content of which is incorporated by reference herein in its entirety.

TECHNICAL FIELD

The present disclosure relates to the technical field of steel material processing, and in particular, to a hot working method of a niobium-containing high-alloy austenitic heat-resistant stainless steel bar.

BACKGROUND

In order to improve power generation efficiency and reduce emissions, parameters in thermal power plants, such as steam temperatures and pressures, have been constantly increased. Traditional materials cannot meet the requirements of unit boilers, since the boiler superheater and reheater pipes, as the most demanding parts in the service environment, require use of a large number of a high-performance niobium-containing austenitic heat-resistant stainless steel material. The added Nb element can generate nano-sized MX and NbCrN during service, and the nano-sized MX and NbCrN can be well diffused in the matrix, impede dislocation movement, and improve generation strengthening effect and creep resistance, improving the high temperature resistance of austenitic stainless steel. However, due to the high contents of Cr and Ni in such material, it is easy to form massive niobium compounds during solidification, which significantly reduces the thermoplasticity of the material so that the material is very easy to crack during hot working.

In recent years, in order to reduce production costs, pipe manufacturing enterprises in China have gradually begun to develop hot piercing processes to replace traditional hot extrusion processes, and the size of raw material bars is getting smaller and smaller, from the previous φ 180~250 mm gradually reduced to φ 65~130 mm. Originally, a preparation process of this kind of material bar is direct radial forging of a steel ingot in one heat forging. In the case where the size of a finished product is reduced, if the original process is used for direct forging for forming, repeated firing forging will be needed due to too many passes and too large temperature drop during the forging process, which renders production efficiency is too low; and if a stainless steel ingot is subjected to conventional cogging by primary rolling+hot rolling or cogging by primary rolling+forging to produce a bar with a small size, the surface cracking is serious.

At present, there is an urgent need for a hot working method of a niobium-containing high-alloy austenitic heat-resistant stainless steel bar in order to solve these problems.

SUMMARY

In view of the above problems, the present disclosure is proposed in order to provide a hot working method of a niobium-containing high-alloy austenitic heat-resistant stainless steel bar that overcomes the above problems or at least partially solves the above problems.

In one aspect, a hot working method for a stainless steel bar is provided in the present disclosure, comprising:

Step (1): heating a steel ingot at a heating temperature in a range from 1,200° C. to 1,270° C.;

Step (2): subjecting the heated steel ingot to cogging by radial forging at a total compression ratio greater than 3 to obtain a square billet;

Step (3): heating the square billet at a heating temperature in a range from 1,200° C. to 1,270° C.; and Step (4) subjecting the heated square billet to hot rolling to obtain a bar.

Optionally, in step (1), a holding time is determined according to the following equation:

$$T1 = 0.5D + 600 \times w(Nb) \times 100$$

where:
T1 is a holding time for the steel ingot, in minutes;
D is a diameter of the steel ingot, in millimetres; and
w(Nb) is a mass percent content of Nb.

Optionally, in step (2), a surface temperature at the beginning of the radial forging is in a range from 1,000° C. to 1,050° C., and a surface temperature during the radial forging and at the end of the radial forging is in a range from 900° C. to 950° C.

Optionally, in step (2), the radial forging is carried out in 4 to 10 passes, a single pass deformation and a forging frequency for the first and second passes are respectively 4% to 8% and 200 to 240 times/min, and a single pass deformation and a forging frequency for the subsequent passes are respectively 15% to 20% and 30 to 50 times/min.

Optionally, in step (3), a holding time is determined according to the following equation:

$$T2 = 0.5L + 100 \times w(Nb) \times 100$$

where:
T2 is a holding time for the square billet, in minutes;
L is a side length of the square billet, in millimetres; and
w(Nb) is a mass percent content of Nb.

Optionally, in step (4), a surface temperature at the beginning of the hot rolling is in a range from 1,100° C. to 1,150° C., and a surface temperature during the hot rolling and at the end of the hot rolling 1,000° C. or more.

Optionally, in step (4), the hot rolling is carried out in 5 to 10 passes, a single pass deformation is 10%-15%, and a rolling speed is 1~1.2 m/s.

Optionally, the stainless steel bar has the following elemental composition:
C 0.04% to 0.10%, Si≤0.75%, Mn≤2.00%, P<0.03%, S<0.03%, Cr 24.0% to 26.0%, Ni 17.0% to 23.0%, Nb 0.20% to 0.60%, N 0.15% to 0.35%, and a balance of Fe.

In another aspect, a stainless steel bar is provided in the present disclosure, which is prepared by using the processing method described above.

Compared with the prior art, the present disclosure has at least the following beneficial effects.

The processing method of the present disclosure can avoid the quality defect of surface crack while ensuring production efficiency by optimizing the process flow and controlling key process parameters, so that a niobium-containing high-alloy austenitic heat-resistant stainless steel bar with good surface quality and structure can be prepared.

The bar was tested in accordance with the standard test method for determination of average grain size in ASTME112-2013. The grain size is in a range of Grade 3 to Grade 7, and the grade difference is less than 2.

BRIEF DESCRIPTION OF DRAWINGS

FIG. 1 shows a microstructure of a bar in Example 1 of the present disclosure.

DETAILED DESCRIPTION

In order to fully understand the purpose, features and effects of the present disclosure, the present disclosure is described in detail through the following specific embodiments. Except for the following content, conventional methods or devices in the field are adopted in the process method of the present disclosure. The following terminologies have the meanings commonly understood by those skilled in the art, unless otherwise stated.

In response to the technical difficulties encountered in the production of small-size niobium-containing high-alloy austenitic stainless steel bars, the inventors of the present disclosure conducted an in-depth analysis on the hot working process, and conducted an in-depth study on the process flow and key process parameters.

The elemental composition (in wt %) of the niobium-containing high-alloy austenitic heat-resistant stainless steel is:

C 0.04% to 0.10%, Si≤0.75%, Mn≤2.00%, P<0.03%, S<0.03%, Cr 24.0% to 26.0%, Ni 17.0% to 23.0%, Nb 0.20% to 0.60%, N 0.15% to 0.35%, and a balance of Fe and unavoidable impurities.

It is found by the inventor through researches that the characteristics of the niobium-containing high-alloy austenitic heat-resistant stainless steel bar are as follows: (i) due to high alloying element contents, especially the high N content, the resistance to thermal deformation is relatively large, and the resistance to thermal deformation at a temperature of 1,100~1,200° C. is 1.5~2 times that of a conventional austenitic stainless steel; and (ii) the high Cr content and the inclusion of Nb lead to the easy formation of massive niobium compounds at places where Nb elements are concentrated during solidification of the alloy, resulting in local plastic deterioration and local cracks.

Based on the above research findings, it is further believed that, in terms of process design, due to extremely poor thermoplasticity of the stainless steel material in the form of as-cast structure, if cogging by rolling is adopted, the rolled metal is subjected to tensile stress deformation, however, the deformation conditions are poor, which cannot give full play to the full plasticity of the metal, resulting in surface cracking. Therefore, cogging by radial forging is selected, and the metal is mainly subjected to compressive stress during the deformation process, which results in good plasticity. After radial forging, the deformation recrystallization structure is formed, and the thermoplasticity is greatly improved. In order to improve the production efficiency, the rolling process is used to mold the material. Therefore, the deformation is conducted through the process of "radial forging+rolling".

Based on the above research findings and technical thinking, the inventor of the present disclosure proposed a hot working method of a niobium-containing high-alloy austenitic stainless steel bar. The overall process route of the method is: steel ingot→heating→radical forging of square billet→surface inspection and grinding→heating→hot rolling→straightening→inspection.

Specifically, the processing method of a stainless steel bar according to the present disclosure comprises:
(1) Heating of Steel Ingot The steel ingot is heated at a heating temperature in a range from 1,200° C. to 1,270° C., for example, 1,200° C., 1,210° C., 1,220° C., 1,230° C., 1,240° C., 1,250° C., 1,260° C., or 1,270° C., etc. The holding time is determined according to the following equation:

$$T1=0.5D+600\times w(Nb)\times 100$$

where,
T1 is a holding time for the steel ingot, in minutes;
D is a diameter of the steel ingot, in millimetres; and
w(Nb) is a mass percent content of Nb.

By analyzing the phase diagram of the above niobium-containing high-alloy austenitic stainless steel, supplemented by experimental observations, the inventors found that a low melting point eutectic phase of niobium may be produced when the stainless steel was heated at a temperature greater than 1,270° C., and a NbC phase may be produced when the stainless steel was heated at a temperature less than 1,200° C. However, due to the segregation of the Nb element during solidification, the NbC phase produced in the steel ingot is often massive. Therefore, the selection of the target heating temperature in a range from 1,200° C. to 1,270° C. can not only protect the thermoplasticity from the production of the NbC phase, but also avoid the generation of low melting point eutectic phase at high temperatures.

In addition, it is also found through studies that, in a conventional heating system, the holding time after the required temperature is achieved depends on the diameter D of the steel ingot, and usually is in a range from 0.5 to 0.8 min/mm. The steel ingot can be fully heated within this time period without NbC dissolved. In order to eliminate the massive NbC as much as possible, the holding time should be appropriately extended. However, if the holding time is too long, it will easily lead to too coarse grains and grain boundary cracks. Therefore, it is proposed to determine the holding time of the steel ingot by using the above equation. In this way, the massive NbC can be eliminated as much as possible, and at the same time the grain can be prevented from being too massive or grain boundary cracks can be avoided.

(2) Cogging by Radial Forging

The heated steel ingot is subjected to cogging by radial forging. The total compression ratio during the radial forging should be greater than 3, in order to ensure that the as-cast structure of the steel ingot has been broken.

The surface temperature at the beginning of the radial forging should be controlled in a range from 1,000° C. to 1,050° C., for example, 1,000° C., 1,010° C., 1,020° C., 1,030° C., 1,040° C. or 1,050° C. The surface temperature during the radial forging and at the end of the radial forging should be controlled in a range from 900° C. to 1,050° C., for example, 900° C., 910° C., 920° C., 930° C., 940° C. or 950° C. The grain after dynamic recrystallization is prevented from being growing at low temperatures so as to ensure the fine grain structure of the surface.

The radial forging is carried out in 4 to 10 passes, for example, 4 passes, 5 passes, 6 passes, 7 passes, 8 passes, 9 passes or 10 passes. For the first two passes, high-frequency forging with small deformation is adopted, and the deformation for a single pass is in a range from 4% to 8%, such as 4%, 5%, 6%, 7% or 8%, and the forging frequency is in a range from 200 times/min to 240 times/min, such as 200 times/min, 210 times/min, 220 times/min, 230 times/min or 240 times/min. In this way, the as-cast structure of the surface is broken by rapid forging and small deformation, so that the surface becomes a recrystallized structure with uniform and fine grains and a surface hardening layer is formed, preventing cracks caused by poor plasticity of the cast billet during the cogging. For the subsequent passes, low-frequency forging with large deformation is adapted. The low forging rate and large deformation are adapted to ensure adequate recrystallization in the core deformation process, improving the core structure. The deformation for a single pass is in a range from 15% to 20%, for example, 15%, 16%, 17%, 18%, 19% or 20%. The forging frequency is in a range from 30 times/min to 50 times/min, for example, 30 times/min, 31 times/min, 32 times/min, 33 times/min, 34 times/min, 35 times/min, 36 times/min, 37 times/min, 38 times/min, 39 times/min, 40 times/min, 41 times/min, 42 times/min, 43 times/min, 44 times/min, 45 times/min, 46 times/min, 47 times/min, 48 times/min, 49 times/min or 50 times/min. The resulting product is a square billet.

(3) Heating of Square Billet

The square billet is heated at a heating temperature in a range from 1,200° C. to 1,270° C., for example, 1,200° C., 1,210° C., 1,220° C., 1,230° C., 1,240° C., 1,250° C., 1,260° C. or 1,270° C. In addition, the holding time is determined according to the following equation:

$$T2 = 0.5L + 100 \times w(Nb) \times 100$$

where:

T2 is a holding time for the square billet, in minutes;

L is a side length of the square billet, in millimetres; and w(Nb) is a mass percent content of Nb.

In this equation, 0.5 L is used as a minimum time to ensure uniform firing of the square billet. The holding time after the desired temperature is achieved is usually in a range from 0.5 min/mm to 0.8 min/mm, depending on the diameter D of the steel ingot. In the present disclosure, the holding time is extended to 1.0 min/mm in order to ensure effects. In actual production, considering that stacked square billets in one batch are heated from three sides, one of which is at the bottom side of the furnace, half of the side length is adopted for the time according to the inventor's study, and 0.5 mm is taken as a factor, so that a uniform temperature inside and outside of the heated square billet can be ensured, which can reach 10° C. or lower. In order to maximize the dissolution of NbC, 100×w(Nb)×100 is taken as an additional minimum holding time to maximize the dissolution of NbC, reduce the segregation of other alloy elements, and improve the natural plasticity of the material.

(4) Hot Rolling

Since the as-cast structure has been broken during the radial forging in step (2), the hot rolling is mainly used to protect the surface from cracking. The surface temperature at the beginning of the hot rolling should be controlled in a range from 1,100° C. to 1,150° C. (for example, 1,100° C., 1,110° C., 1,120° C., 1,130° C., 1,140° C. or 1,150° C.). Since the thermoplastic of the stainless steel material drops sharply below 1,000° C. and it is easier to crack due to tensile stress during the hot rolling, the surface temperature during the hot rolling and at the end of the hot rolling should be controlled at 1,000° C. or more, and it is ensured that the temperature is in the optimal thermoplastic zone.

Depending on finished product specifications, the hot rolling is carried out in 5-10 passes, such as, 5 passes, 6 passes, 7 passes, 8 passes, 9 passes or 10 passes. The deformation for a single pass is in a range from 10% to 15%, such as 10%, 11%, 12%, 13%, 14% or 15%, and the rolling speed is in a range from 1 m/s to 1.2 m/s, such as 1 m/s, 1.1 m/s or 1.2 m/s.

Then, straightening and inspection can be carried out by conventional methods, which will not be described here.

The hot rolling is mainly used for forming, that is, during the production, the stainless steel material is produced to a product with required specifications in the deformation temperature range (i.e., the best deformation temperature range), to avoid waste products caused by cracking due to the hot rolling.

EXAMPLES

The present disclosure is further described by way of embodiments, however, it is not thereby limited to the described embodiments. Experimental methods for which specific conditions are not indicated in the following embodiments are selected according to conventional methods and conditions, or according to the product description.

Example 1

The elemental composition of stainless steel in this example is: C 0.05%, Si 0.23%, Mn 0.78%, P 0.021%, S 0.001%, Cr 25.1%, Ni 21.2%, Nb 0.5%, N 0.26%, and a balance of Fe.

The steel ingot has a size of 1600 mm, and the target bar has a size of Φ140 mm.

The general process route comprises: steel ingot→heating→radial forging of square billet→surface inspection and grinding→heating→hot rolling→straightening→inspection. The details are as follows:

1. Heating of steel ingot: the target temperature is 1,230° C., and the holding time is 600 min.
2. Cogging by radial forging: the temperature at the beginning of the radial forging is 1,030° C.; the radial forging is carried out in 9 passes, and for the first 2 passes, the deformation is 6%, and the radial forging frequency is 210 times/min; and for the last 7 passes, the deformation of is 16%, and the radial forging frequency is 45 times/min. The temperature at the end of the radial forging is 920° C., and the square billet has a size of 271×271 mm.
3. Heating of square billet: the heating temperature is 1,250° C., and the holding time is 185 min.
4. Hot rolling: the surface temperature at the beginning of the hot rolling is 1,120° C., and the surface temperature at the end of the hot rolling is 1,050° C. The hot rolling is carried out in 8 passes. The deformation for the first 4 passes is 13%, the deformation for the last 4 passes is 11%, and the rolling speed is 1 m/s.

The microstructure of the prepared bar is shown in FIG. 1. It can be seen from FIG. 1 that the bar possesses good structure and uniform grain size.

Example 2

The Nb content of a steel grade is 0.4%, the steel ingot has a size of Φ 500 mm, and the target bar has a size of Φ 140 mm. The general process route comprises: steel ingot→heating→radial forging of square billet→surface inspection and grinding→heating→hot rolling→straightening→inspection. The details are as follows:

1. Heating of steel ingot: the target temperature is 1,230° C., and the holding time is 490 min.

2. Cogging by radial forging: the temperature at the beginning of the radial forging is 1,040° C.; the forging is carried out in 9 passes, and for the first 2 passes, the deformation is 7%, and the radial forging frequency is 215 times/min; and for the last 7 passes, the deformation of is 20%, and the radial forging frequency is 50 times/min. The temperature at the end of the radial forging is 930° C., and the square billet has a size of 220×220 mm.
3. Heating of square billet: the heating temperature is 1,260° C., and the holding time is 150 min.
4. Hot rolling: the surface temperature at the beginning of the hot rolling is 1,130° C., and the surface temperature at the end of the hot rolling is 1,030° C. The rolling is carried out in 7 passes. The deformation for the first 5 passes is 15%, the deformation for the last 2 passes is 13%, and the rolling speed is 1.1 m/s.

Effect Test:

According to the standard test method for determination of average grain size in ASTME112-2013, the bars obtained in Examples 1 and 2 were tested for tissue grain size, and the results were as follows.

TABLE 1

|  | Grain size | Range |
|---|---|---|
| Example 1 | 5-6 | 1 |
| Example 2 | 4-5 | 1 |

The above-mentioned examples are preferred examples of the present disclosure. However, the embodiments of the present disclosure are not limited by the above-mentioned examples, and any other substitutions, modifications, combinations, changes, modifications, and simplifications made without departing from the spirit and principle of the present disclosure should all be equivalent replacement methods, which are all included in the protection scope of the present disclosure.

The invention claimed is:

1. A hot working method of a stainless steel bar, comprising:

Step (1): heating a steel ingot at a heating temperature in a range from 1,200° C. to 1,270° C.;

wherein a holding time is determined according to the following equation:

$$T1=0.5D+600 \times w(Nb) \times 100$$

where:

T1 is a holding time for the steel ingot, in minutes;

D is a diameter of the steel ingot, in millimetres; and w(Nb) is a mass percent content of Nb;

Step (2): subjecting the heated steel ingot to cogging by radial forging at a total compression ratio greater than 3 to obtain a square billet;

Step (3): heating the square billet at a heating temperature in a range from 1,200° C. to 1,270° C.;

wherein a holding time is determined according to the following equation:

$$T2=0.5L+100 \times w(Nb) \times 100$$

where:

T2 is a holding time for the square billet, in minutes;

L is a side length of the square billet, in millimetres; and w(Nb) is a mass percent content of Nb, and Step (4) subjecting the heated square billet to hot rolling to obtain the stainless steel bar;

wherein the stainless steel bar has the following elemental composition: C 0.04 wt % to 0.10 wt %, Si≤0.75 wt %, Mn≤2.00 wt %, P<0.03 wt %, S<0.03 wt %, Cr 24.0 wt % to 26.0 wt %, Ni 17.0 wt % to 23.0 wt %, Nb 0.20 wt % to 0.60 wt %, N 0.15 wt % to 0.35 wt %, and a balance of Fe.

2. The method according to claim 1, wherein in step (2), a surface temperature at the beginning of the radial forging is in a range from 1,000° C. to 1,050° C., and a surface temperature during the radial forging and at the end of the radial forging is in a range from 900° C. to 950° C.

3. The method according to claim 1, wherein in step (2), the radial forging is carried out in 4 to 10 passes, a single pass deformation and a forging frequency for first and second passes are respectively 4% to 8% and 200 to 240 times/min, and a single pass deformation and a forging frequency for the subsequent passes are respectively 15% to 20% and 30 to 50 times/min.

4. The method according to claim 1, wherein in step (4), a surface temperature at the beginning of the hot rolling is in a range from 1,100° C. to 1,150° C., and a surface temperature during the hot rolling and at the end of the hot rolling is 1,000° C. or more.

5. The method according to claim 1, wherein in step (4), the hot rolling is carried out in 5 to 10 passes, a single pass deformation is 10%~15%, and a rolling speed is 1~1.2 m/s.

6. A stainless steel bar, which is prepared by using the hot working method according to claim 1.

* * * * *